United States Patent [19]

Okamoto et al.

[11] Patent Number: 5,005,786
[45] Date of Patent: Apr. 9, 1991

[54] DOCKING AND ACTIVE DAMPING DEVICE FOR SPACE STRUCTURES

[75] Inventors: Osamu Okamoto, Higashiyamato; Teruomi Nakaya, Machida; Seizo Suzuki, Mitaka; Naoaki Kuwano, Chofu; Yoshinori Sakai, Kakamigahara; Hiroshi Oda, Takatsuki; Masao Uegusa, Yachiyo; Goji Iba, Toyama, all of Japan

[73] Assignees: National Aerospace Laboratory of Science & Technology Agency, Tokyo; Kawasaki Industries, Ltd., Kobe, both of Japan

[21] Appl. No.: 402,586

[22] Filed: Sep. 5, 1989

[30] Foreign Application Priority Data

Mar. 1, 1989 [JP] Japan ................................. 1-46479

[51] Int. Cl.$^5$ .............................................. B64G 1/64
[52] U.S. Cl. .................................................... 244/161
[58] Field of Search ..................................... 244/161, 3

[56] References Cited

U.S. PATENT DOCUMENTS 4,177,964 12/1979 Hujsak et al. ...................... 244/161
4,860,975 8/1989 Schliesing et al. ................. 244/161

OTHER PUBLICATIONS

Takashi Kida, "A Preliminary Study on a Linear Inertial Actuator for LSS Control", *Proceedings of the Fifteenth International Symposium on Space Technology and Science*, vol. II, pp. 1273-1278; 1986.
Etsujiro Shimemura, "A Consideration to Vibration Control for a Large Space Structures", *Proceedings of the Fifteen International Symposium on Space Technology and Science*, vol. 11, pp. 1237-1241; 1986.
Gene C. Burns, "Space Station Full-Scale Docking/Berthing Mechanisms Development", pp. 325-340; 1988.
A. P. Matthews, "Development of an Intermodule Connector for Serviceable Spacecraft", *Proceeding of the 3rd European Space Mechanisms & Tribology Symposium*, pp. 169-176, 1987.

Primary Examiner—Joseph F. Peters, Jr.
Assistant Examiner—Anne E. Bidwell
Attorney, Agent, or Firm—Armstrong, Nikaido, Marmelstein, Kubovcik & Murray

[57] ABSTRACT

A docking and active damping device for space structures is provided, in a docking portion of one space structure to be docked, with a positioning device in which an output rotor can be moved and rotated within a two-dimensional plane by a composite rotation of one or more eccentric rotors capable of being independently driven and controlled by a direct drive motor and the output rotor, and a docking member having a docking ring and a latch mechanism are supported on the output rotor of the positioning device. A probe having a capture device capable of being protruded and driven in an axial direction by a linear motion is provided inwardly of the docking member, and the probe provides a 4-freedom movement according to a position of the passive side to capture and dock a drogue. The docking ring is supported through a strain sensor, a vibration of the passive side structure is detected, and the docking member is moved in a direction of suppressing the vibration to promptly suppress the vibration caused by disturbances from the inside and outside of the space structures.

6 Claims, 9 Drawing Sheets

DOCKING AND ACTIVE DAMPING DEVICE FOR SPACE STRUCTURES

BACKGROUND OF THE INVENTION

(1) Field of the Invention

The present invention relates to a docking and active damping device for space structures such as space stations, and more particularly to a docking and active damping device for space structures provided in a docking portion of space structures which can dock space structures with each other or space structure elements used to assemble space structures, and which can suppress vibrations of space structures in the docked state.

(2) Description of the Prior Art

Docking devices for spacecraft heretofore known roughly include a cone and ring system, a probe and drogue system, a guide vane system and the like.

In any of these systems of the conventional docking device, adjustment of a deviation in axis thereof has been made in a manner such that a plurality of inclined pitch arms arranged peripherally in an equally spaced relation are actuated by a hydraulic cylinder, an electric cylinder or a spring. However, the range of such adjustment is small. For example, in the conventional systems, an adjustable range of pitching and rolling angle is only 10° or so. Therefore, in the conventional systems, a fine control of attitude of a spacecraft itself is required for both passive and active spacecraft. After docking, both spacecraft move as one spacecraft, and the attitude control system cannot control to each other.

The present space facility is of a single capsule system and a solar battery paddle is small-scaled. Therefore, a large space structure which is assembled in space and of which internal and external vibrations have to be suppressed has not yet been realized. The technology for assembling large-scaled space structures in space and the active damping technology are in the field not yet developed and have not been put to practical use.

However, when the construction of large-scaled space structures such as practical space stations is initiated in the future, the active damping technology for vibration suppression of the space structures as well as the soft docking technology in space become an important problem. The reason why is that the space structures are in the state subjected to vibrations resulting from thermal strains, or a very small amount of internal and external disturbances such as shocks generated when space shuttles or the like are docked, and when the space structures are vibrated, experiments or manufacture under a low gravitational state performed therein or an astronomical observation in a fixed attitude are adversely affected by the vibrations. As the scale of the space structures become larger, the greater is the influence. It is necessary to suppress the vibrations of the space structures in order to perform the aforesaid experiments or the like in a satisfactory manner.

U.S. Pat. No. 4,749,898 is a prior art on which the invention of this application is based.

SUMMARY OF THE INVENTION

An object of the present invention is to provide a compact docking and active damping device for space structures in which the docking device itself can be moved in response to the position of a mating side to be docked to capture the mating side, and which can positively and easily perform docking without a strict attitude control of space structures on the passive and active sides or space structure elements themselves.

Another object of the present invention is to provide a docking and active damping device in which a probe on the active side can be moved in a two-dimensional plane in response to a deviation in position on the passive side to easily perform docking even if a deviation in position when in docking is large.

A further object of the present invention is to provide a docking and active damping device which can freely control the attitude of a space structure on the passive side even after completion of docking.

A still further object of the present invention is to provide a docking and active damping device for space structures provided in a docking portion of the space structure which is compact in construction and has an active damping function capable of detecting a vibration of the space structure to quickly suppress the vibration.

A still further object of the present invention is to provide a docking and active damping device for space structures in which a vibration of a structure to be docked is suppressed by actuating a docking member in a three-dimensional plane or axial rotation thereof by an electrically direct drive positioning device in response to the vibration of the space structure.

A still further object of the present invention is to provide a docking and active damping device for space structures which can constitute a passage for transfer of persons or materials between the space structures after docking.

For achieving the aforesaid objects, the docking and active damping device for space structures has a fixed cylinder provided on a frame of a docking portion of one space structure to be docked, one or more eccentric rotors successively eccentrically provided between said fixed cylinder and an output rotor, and a hollow output rotor provided at an eccentric position of the final eccentric rotor, and comprises a positioning device in which said eccentric rotors and said output rotor can be independently driven and controlled by an electric direct-driven motor, a docking member being supported on the output rotor of said positioning device. The docking member has a docking ring which is mated with a docking surface of the other space structure to be docked and a plurality of latch mechanisms in the outer peripheral portion of the docking surface, the docking member capable of being moved within a two-dimensional plane vertical to at least the docking direction and axially rotated to control the attitude of the mating space structure. The docking member has a cylindrical parts fitted in a hollow portion of the output rotor of the positioning device, said cylindrical parts having a docking ring at the extreme end thereof, the docking member being provided movably in a axial direction of the output rotor. A probe having a capture mechanism at the extreme end thereof to capture the other space structure is fitted in the cylindrical parts of the docking member so that the probe may be expansibly driven. The probe can be removed from the hollow portion of the docking member after the space structure to be docked has been docked.

A docking member having the other from is provided at the extreme end of an output shaft of the positioning device. In that case, a probe is provided in the hollow portion of the output rotor of the positioning device. This probe has a latch mechanism at the extreme end thereof which is connected to a drogue of a space structure to be docked, the probe being axially protruded by axial drive means and being moved within a two-dimensional plane vertical to the axial direction and axially rotated by said positioning device.

Further, there are provided a vibration detection means for detecting vibrations of the other space structure docked and a control means for controlling the positioning device so that the docking member is actuated in a direction of suppressing the vibrations of the structure elements to be docked by the output signal of the vibration detection means, whereby the vibrations caused by the internal and external disturbances of the space structures can be quickly suppressed. As one form of the vibration detection means, a strain sensor is mounted on a docking ring mounting base to the cylindrical parts of the docking member, so that when the docked mating space structure is vibrated, the strain sensor detects a strain produced by the vibration.

The active damping device for the space structures is constructed as described above and has the capture function and the active damping function. After docking, the space structure on the passive side can be promptly displaced by the movement of four components, X, Y, Z and $\theta$ in response to the relative vibrations. Therefore, vibrations including fine vibrations and multi-mode and complicated large vibrations can be effectively damped. The device can be constructed to be compact. The positioning device may produce a high torque and has an extremely high resolving power since each rotor is electrically directly driven, can control a fine movement and can locate the docking member with high accuracy. The capture device having a probe is provided on the docking member whereby the probe can be applied with movements of four components including movement in directions of X, Y and Z axes and rotation $\theta$ of axis Z, and an alignment function when the structure elements to be docked are captured is rapidly enhanced. Accordingly, in the present invention, the docking can be easily accomplished even if a deviation in axis is large as compared with the conventional docking device. Since the axis portion of the docking member positioning device can be formed into a hollow large type, both the docked structure elements become communicated with each other through the present docking and active damping device so as to render the transfer of persons and materials possible. The docking member is made to be constituted by a probe directly supported on the Z-axis translation means whereby the device can be made compact and can be also applied to a docking portion between small structure elements.

DESCRIPTION OF THE PREFERRED EMBODIMENTS

Figure 1:
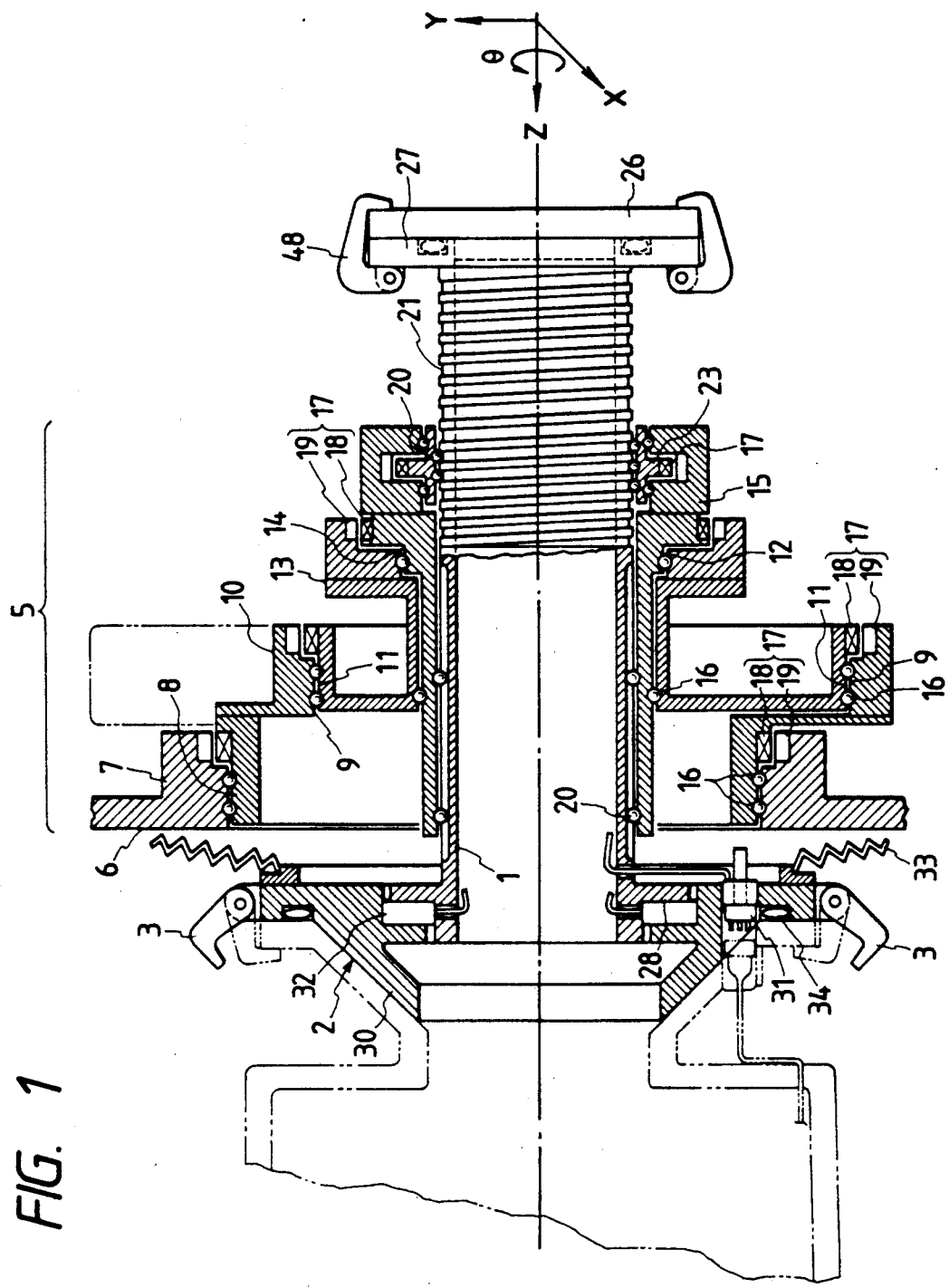
FIG. 1 is a side sectional view of a docking and active damping device for space structures according to this invention.
Figure 6:
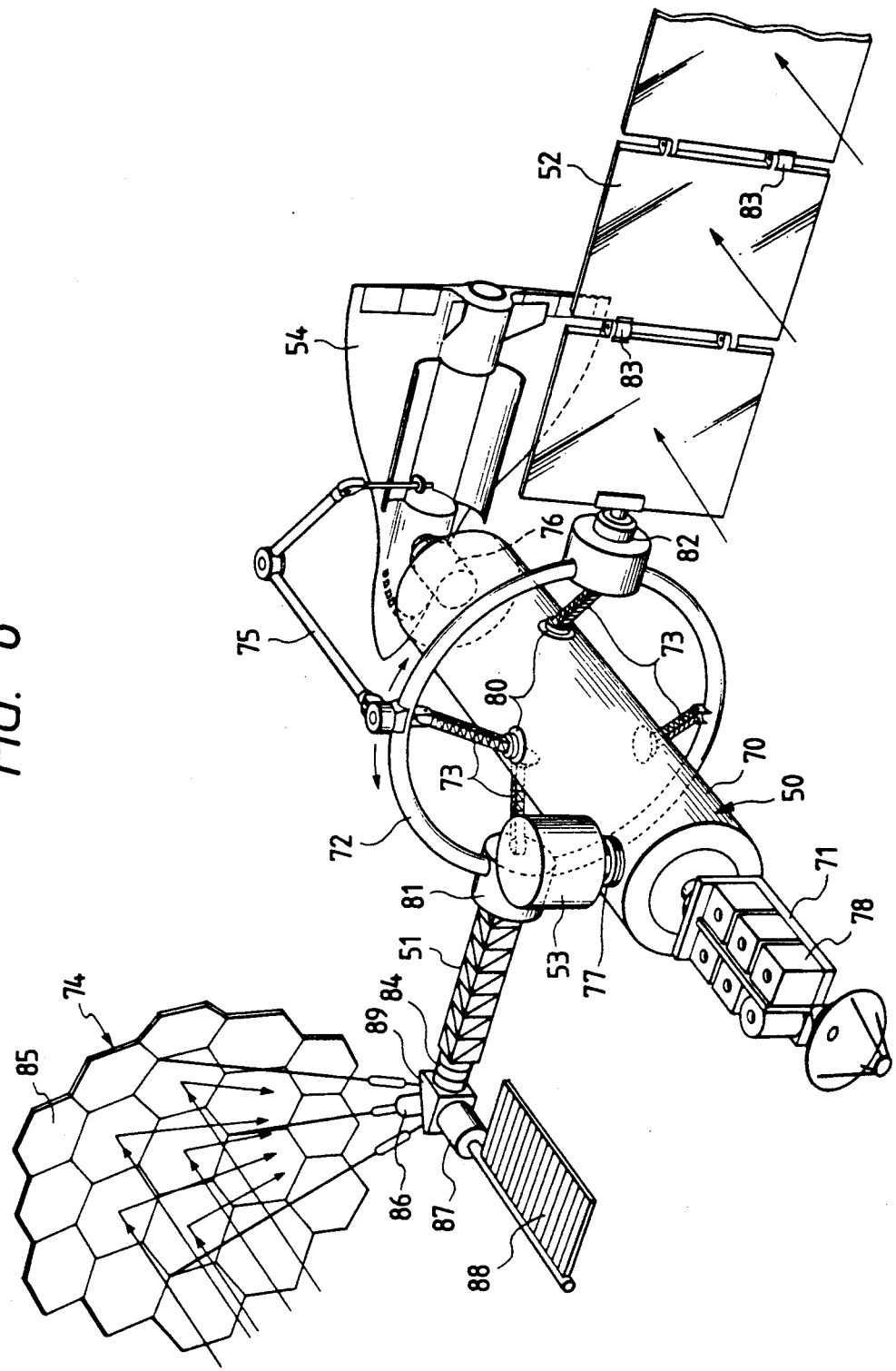
FIG. 6 is an imaginary schematic perspective view of space structures to which is applied a docking and active damping device for space structures according to this invention.

FIG. 1 shows one embodiment of a docking and active damping device having an active damping function of a space structure according to the present invention, the device being provided, for example, on the active side of a docking portion and a connecting portion of the space structure in a space station or the like as shown in FIG. 6. In the figure, reference numeral 1 designates a docking member provided with a docking ring 2 having a latch 3 for locking a docking portion of a passive side structure. In the present invention, the docking member 1 can provide movement having four components including movements in directions X, Y and Z axes of rectangular coordinates and an axial rotation $\theta$, and the passive side structure can be controlled in movement by the docking member 1 in a direction of suppressing the vibration in response to an occurrence of the vibration on the passive side. As a device for holding the docking member 1 to apply a moment thereof, a positioning device 5 as will be described below is employed.

The positioning device 5 comprises a fixed cylinder 7 formed on a frame 6 on the docking side of an active side structure such as an experimental module, a first eccentric rotor 10 having a cylinder outer wall 8 fitted in the fixed cylinder 7 and formed with a cylinder inner wall 9 at a position eccentric with the axis thereof, a second eccentric rotor 13 having a cylinder outer wall 11 fitted in the cylinder inner wall 9 of the first eccentric rotor 10 and formed with a cylinder inner wall 12 at a position eccentric with the axis thereof, and a hollow output rotor 15 having a cylinder outer wall 14 fitted in the cylinder inner wall 12 of the second eccentric rotor 13, which elements are successively fitted through bearings 16 such as ball bearings and rotatably assembled. In each fitting portion is provided a direct drive motor 17 which independently normally and reversely rotates the first eccentric rotor 10 with respect to the fixed cylinder 7, the second eccentric rotor 13 with respect to the first eccentric rotor 10 and the output rotor 15 with respect to the second eccentric rotor 13, respectively. Reference numeral 18 designates a permanent magnet constituting the motor, and 19 an armature winding. In the first eccentric rotor 10 and the second eccentric rotor 15, the axes thereof translate within the X-Y plane according to the eccentric amount of their rotational angle to constitute an X-Y plane translation rotor.

The docking member 1 is fitted in the output rotor 15 of the positioning device 5 by the bearing 20 so that the docking member 1 may be rotated and slidden in the axial direction (in the direction of axis Z). As a moving mechanism of the docking member in an axial direction, a suitable linear drive mechanism such as a linear motor can be employed, but in the illustrated embodiment, a ball thread mechanism is employed. The docking member has its rear portion formed with threads 21 in which is engaged a ball 20, and a Z-axis translation rotor 23 which is a ball thread drive ring having the ball 20 fitted in the inner peripheral surface thereof is provided at the rear end of the output rotor through the direct drive motor 17. Accordingly, the docking member 1 moves within the X-Y plane according to the eccentric amount thereof with the first eccentric rotor and the second eccentric rotor rotated by the direct drive motor, performs the rotation $\theta$ about the axis thereof with the output rotor 15 rotated, and performs the translation motion in the direction of axis Z with the Z-axis translation rotor 23 rotated.

Figure 2:
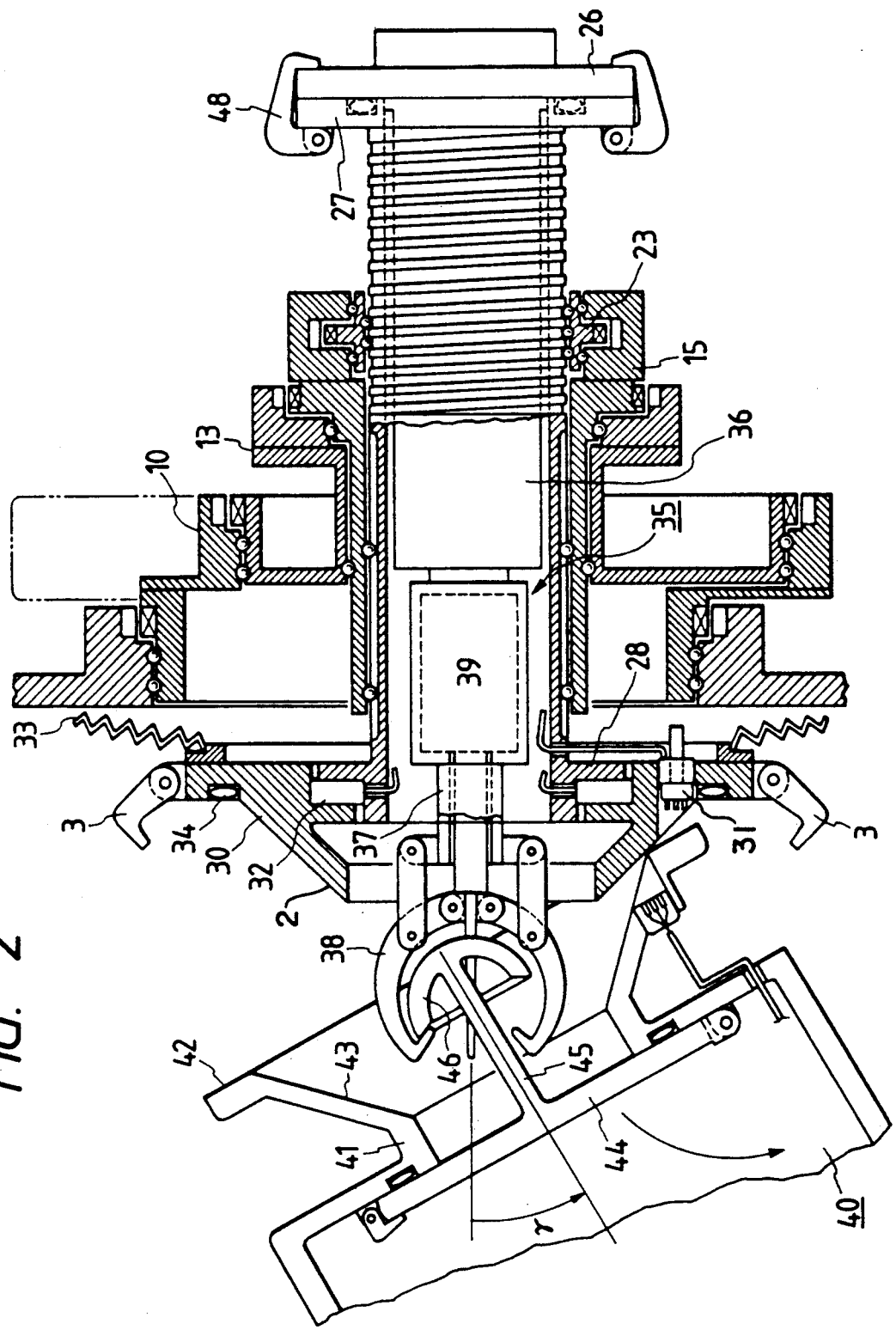
FIG. 2 is a side sectional view of a docking and active damping device for space structures according to this invention in a state wherein a structure to be docked is captured and docked.
Figure 5:
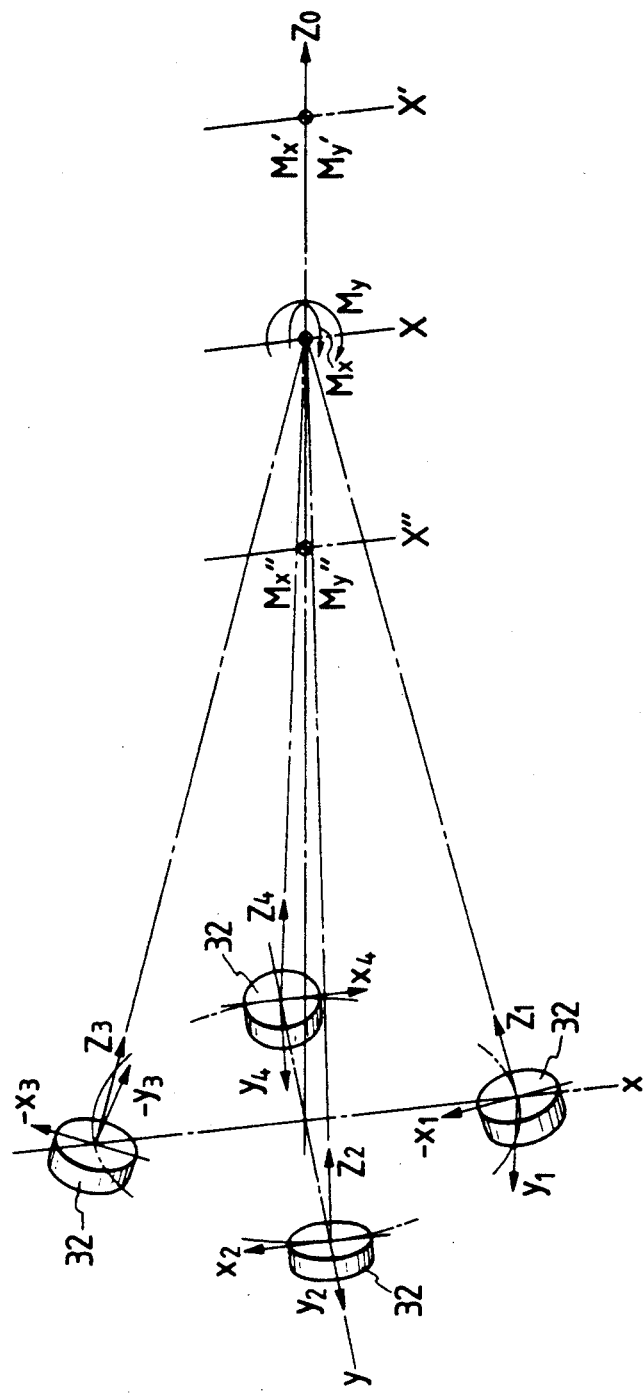
FIG. 5 is a view of arrangement of a strain sensor in a docking and active damping device for space structures according to this invention.

As shown in FIG. 2, the docking member 1 is formed into a hollow cylinder so that a capture device 35 for capturing the passive side structure may be accommodated therein and after completion of the docking, the capture device may be removed to render the movement of articles and persons between the structures possible. On the end internally of the docking member 1 is formed a flange 27 used to mount an air-tight cover 26 for sealing the hollow portion to secure the air tightness within the structure before the completion of docking. On the end externally of the docking member is formed a docking mounting portion 28 for mounting the docking ring 2. The docking ring 2 is formed in the central portion with a conical convex portion 30 in engagement with a conical concave portion of a drogue of the passive side structure, and in order to make possible the transmission of signals or energies between the structures after docking, an umbilical connector 31 is provided at a suitable position of the outer peripheral plane, which connector 31 has an actuator for detachably connecting these signal lines and energy transmission lines. A plurality of drogue latches 3 are provided in the outer peripheral portion and the actuator for the drogue latch is actuated after the capture of the passive side structure to connect both the elements. The docking ring 2 is mounted on the docking ring installing portion 28 of the docking member 1 through an active damping sensor 32 in the form of a strain sensor. The active damping sensor 32 detects a strain stress in the docking portion resulting from a moment produced when a relative vibration occurs between the two docked structures. In order to detect the occurrence of moments in all directions, it is desired that the integral type over the whole periphery of the docking portion or the scattered type densely arranged over the whole periphery thereof is employed. In practice, however, the scattered type in which four sensors are arranged at intervals of 90° as shown in FIG. 5 will suffice. Reference numeral 33 designates a bellows for air-tightly shielding between the docking ring and the docking side frame to keep the interior of the structure air-tight, the bellows being rotatably mounted on the docking ring or the frame 6. Reference numeral 34 designates a seal ring for keeping the docking portion air-tight.

Figure 3:
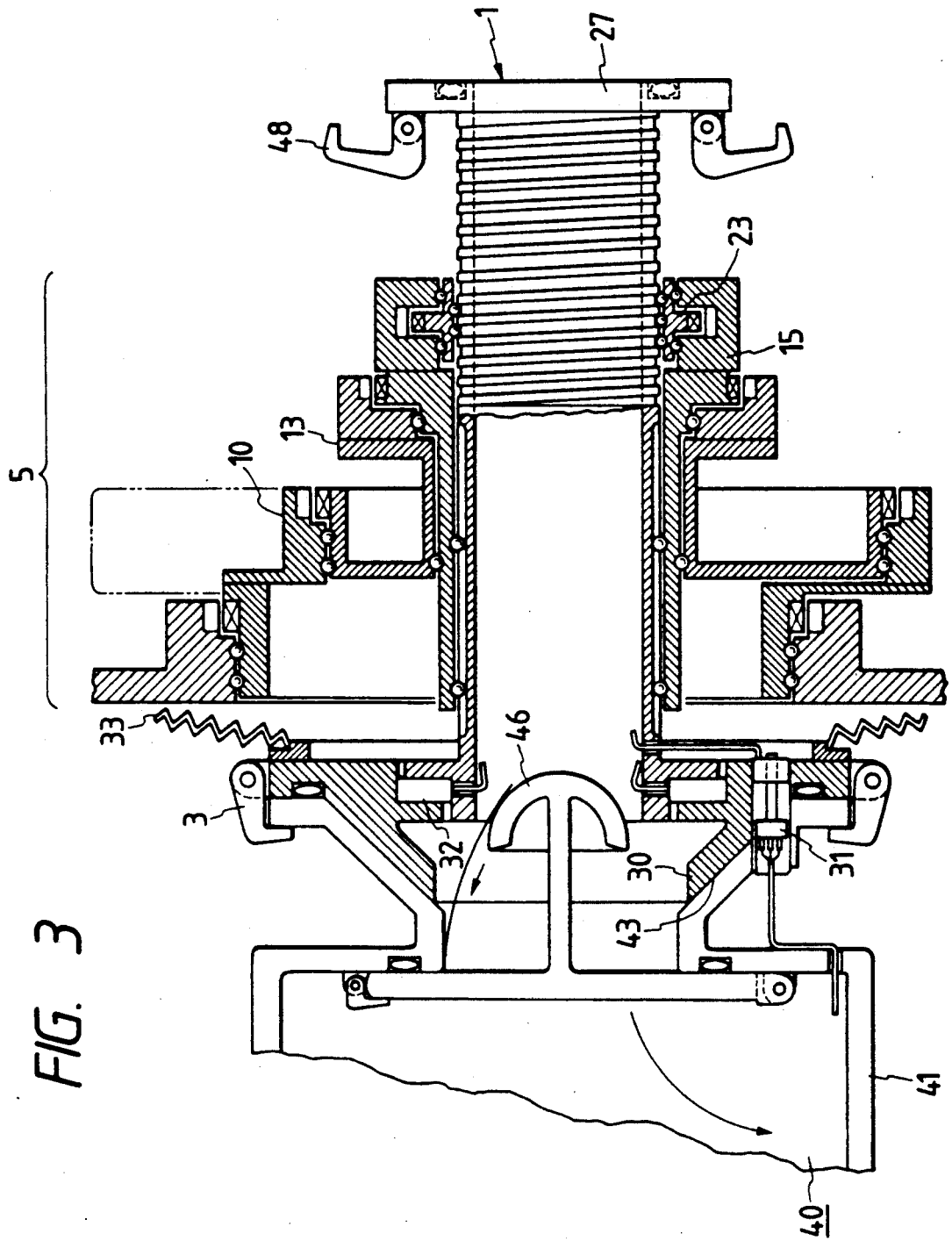
FIG. 3 is a side sectional view of a docking and active damping device for space structures according to this invention in a state wherein an active side structure is docked with a passive side structure.

FIGS. 2 and 3 show the aforementioned docking device in which a capture device 35 having a probe is provided within the docking member, the structures are captured and docked such that for example, a logistic module or a space shuttle is docked to the space structure body.

In the capture device 35, a probe extension mechanism 36 is secured to a hatch cover and air-tight cover 26 for closing an open end internally of the docking member 1 to extend and drive a probe 37 outwardly (in a direction of axis Z). A pawl type latch 38 in engagement with a latch engaging member 45 provided on a drogue 41 formed on the passive side structure is provided at the extreme end externally of the probe 37 so that the latch 38 may be opened and closed by a link mechanism driven by a latch actuator 39. The probe extension mechanism 36 employed comprises a suitable mechanism such as a ball thread mechanism, a linear motor or the like. On the other hand, a hatch and drogue 41 on the docking side is formed on the passive side structure 40, and an open end wall 42 thereof is formed in its central portion with a conical concave portion 43 in engagement with a conical convex portion 30 of the docking ring 2. The drogue 41 is provided with a drogue hatch and air-tight cover 44 so that the latter may be opened and closed, and a latch engaging member 45 is protruded from the central portion of the air-tight cover 44 toward the outside, the latch engaging member 45 having its extreme end 46 formed into a semicircular configuration with which is engaged the pawl type latch 38 of the probe. Although not shown, a detection device such as a television camera is mounted as needed on the docking ring 2 or the extreme end of the probe in order to detect the position or state of the passive side structure when the latter is docked.

The docking and active damping device for space structures according to the present embodiment constructed as described above has two functions, i.e., the function for capturing and docking the passive side structure, and the active damping function after docking. First, the former docking function will be described hereinafter.

It is assumed for example that in FIG. 2, the space structure or the experimental module as the active side and the logistic module as the passive side are docked. The docking device in the above-described embodiment is provided on the active side, and the drogue 41 is provided on the passive side. When the logistic module moves close to the experimental module, the probe extension mechanism 36 is actuated so that the probe 37 extends forwardly (in a direction of axis Z) from the positioning device 5. At the same time, the position of the drogue is detected by the detection device provided on the docking ring 2 to obtain a position control data of the probe 37. The rotational pulse number (rotational angle) of each of the eccentric motors 10 and 13 for defining the translation position in the two-dimensional plane of the probe 37 is computed from the position control data and then inputted into a controller of the electric direct drive motor 17 for driving the eccentric rotor so that the eccentric rotor is so driven. The eccentric amounts of the eccentric rotors are synthesized by the rotation of the eccentric rotors. It is assumed for example that the center of the first eccentric rotor 10 is deviated by length $L_1$ from the center of the fixed cylinder 7 and the center of the second eccentric rotor 13 is deviated by length $L_2$ from the center of the first eccentric rotor 10. Then, the axis of the output rotor 15 can be moved in the range within a circle having the radius $L_1+L_2$ about the center point of the fixed cylinder 7 to locate the probe 37 to the desired position of the X-Y plane. The output rotor 15 is rotated according to the rotational angle of the drogue 41 to rotate the probe 37 about the axis thereof so that docked surfaces are completely registered. Each rotor is electrically and directly driven, and therefore the rotor has an extremely high resolution, thus capable of controlling a fine movement in 0.1 micron order and capable of performing highly precise positioning. Accordingly, the position of the drogue 41 is detected when docking and at the same time the probe 37 causes the translation movement and rotation in the two-dimensional plane while adjusting to the detected position to move close to the drogue 41 while finely controlling the position. The drogue 41 can be positively captured.

When the drogue 41 is captured by the probe 37, the pawl type latch 38 of the probe 37 is originally in the state opened by the latch actuator 39. When the pawl type latch 38 reaches the position of the extreme end 46 of the latch engaging member 45 of the drogue 41, the latch actuator 39 is actuated to close the pawl type latch 38 for engagement with the extreme end 46 of the latch engaging member (the state of FIG. 2). When the probe extension mechanism 36 is actuated, from that state, to pull the latch, the drogue 41 is gradually pulled by engagement with the pawl type latch 38. Even if the axis of the drogue 41 is inclined through an angle with respect to the probe 37, the conical concave portion 43 of the drogue 41 is guided to the conical convex portion 30 of the docking ring 2 to gradually correct the attitude thereof so that the axis of the drogue 41 is placed in alignment with the axis of the probe 37 and the docking ring 2 is placed in complete alignment with the open end of the drogue 41. When both the elements are aligned, the actuator of the drogue latch 3 is actuated so that the drogue latch 3 engages the open end of the drogue 41 to integrally connect them in an air-tight manner. At the same time, the docking ring 2 and the actuator of the umbilical connector 31 provided at the open end of the drogue 41 are actuated to effect umbilical connection of signal cables, energy cables or the like between the docked structures.

Upon termination of connection of both the elements, the latch actuator 39 is actuated to release the engagement between the pawl type latch 38 and the latch engaging member 45 of the drogue 41 to contract the probe 37. In that state, the probe latch 48 is actuated to release the engagement between the air-tight cover 26 and the flange 27 at the end of the docking member to remove the capture device 35 from the docking member. When the air-tight cover 44 on the side of the drogue 41 is rotated inwardly, both the experimental module and the logistic module are communicated through the hollow docking member 1 and docked in a manner such that the movement of material and movement of persons therebetween may be made.

Next, the active damping function of the device shown in the present embodiment in the thus docked and assembled space structures will be described hereinafter.

The space structures vibrate under weightless conditions, and in the attitude control thereof, it is effective to carry out the active damping while interfering both the passive and active sides. Therefore, with respect to structures of which vibration is to be suppressed such as the experimental module located internally of large space structures such as space stations as shown in FIG. 6, it is effective to detect 3-axis moments Mx, My and Mz to effect the control by a moment control system as shown in FIG. 5 rather than the detection of displacements X, Y and Z of relatively fine 3-axis translation motions. To this end, in the present embodiment, the strain sensors 32 are arranged at intervals of 90° circumferentially in the docking portion between the docking ring and the docking mounting portion 28 to measure the occurrence of moments caused by the vibrations at 3-axis moments Mx, My and Mz at the circumferential positions, and the output signals thereof are analyzed by a high speed vibration analyzer to feedback them to the docking device for active damping.

The supporting of the large structures of which vibration is to be suppressed such as a solar battery paddle, a solar dynamic generator and the like mounted externally of the large space structures is of the cantilever type. Therefore, 6-axis physical amounts X, Y, Z, Mx, My and Mz caused by large vibrations are detected by the sensors provided on the docking device, and separately therefrom, sensors such as accelerometers for detecting vibrations are provided on the structure of which vibration is to be suppressed to apply the signals to control them in a composite manner, thus rendering a positive control of active damping possible.

Figure 4:
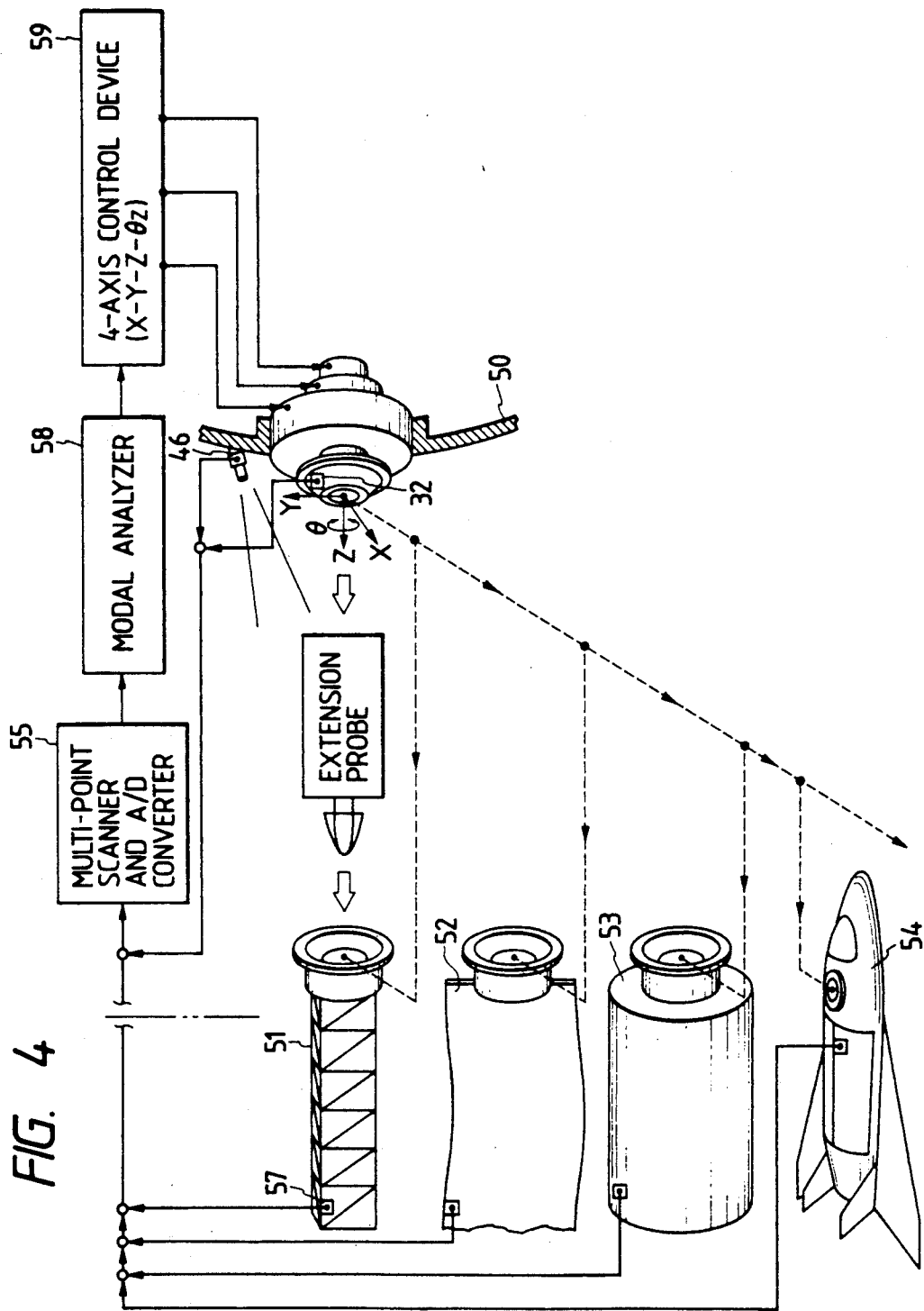
FIG. 4 is a control block diagram of a docking and active damping device for space structures according to this invention.

FIG. 4 is a block diagram for such a control as described above. As a typical example of the large structure of which vibration is to be suppressed mounted externally of the large space structure, there is shown a control block diagram of the docking device in case of suppressing the vibrations occurred in the space structures assembled by connecting a deployable mast 51 mounted on the solar dynamic generator, a solar battery paddle 52, a logistic module 53 and a space shuttle 54 to a space structure body 50 (experimental module) on the active side.

On the active side, the aforesaid strain-detection active damping sensor 32 and a displacement sensor 46 such as a television camera, a laser device or the like are provided, whereas on the structure elements on the passive side is provided a vibration sensor 57 such as an accelero-meter for detecting vibrations of these elements. Outputs from these sensors are sequentially read by a multi-point scanner and Analog/Digital converter, and the vibration mode at that time is analyzed by a model analyzer 58. The moving position of the passive side for active damping is applied as a control signal of 4-axis X-Y-Z-$\theta$ to a 4-axis control device 59, Signals are applied from the control device 59 to controllers of the electric direct drive motors 17 for the first eccentric rotor 10, the second eccentric rotor 13, the output rotor 15 and the Z-axis translation rotor to control the output of the motor 17 whereby the docking member 1 is displaced to move the structure on the passive side in a direction of active damping for control of the vibrations.

FIG. 6 is a conceptual imaginary view of an experimental module platform to which the docking device of the present invention as described above is applied. The experimental module 50 (space structure body) has a pressurized module 70 and an exposed facility 71. A ring track 72 is supported externally of the pressurized module 70 by means of four supporting beams 73. A solar battery paddle 52 and a manipulator 75 are coupled to the ring track 72. And a solar dynamic generator 74 is coupled to the ring track 72 though the deployable mast 51, and a manipulator 75. The pressurized module 70 is provided with a docking hatch 76 for the space shuttle 54 and a docking hatch 77 for the logistic module 53, which can be connected. An orbital replaceable unit 78 can be placed on the exposed facility 71 of the experimental module.

Figure 7:
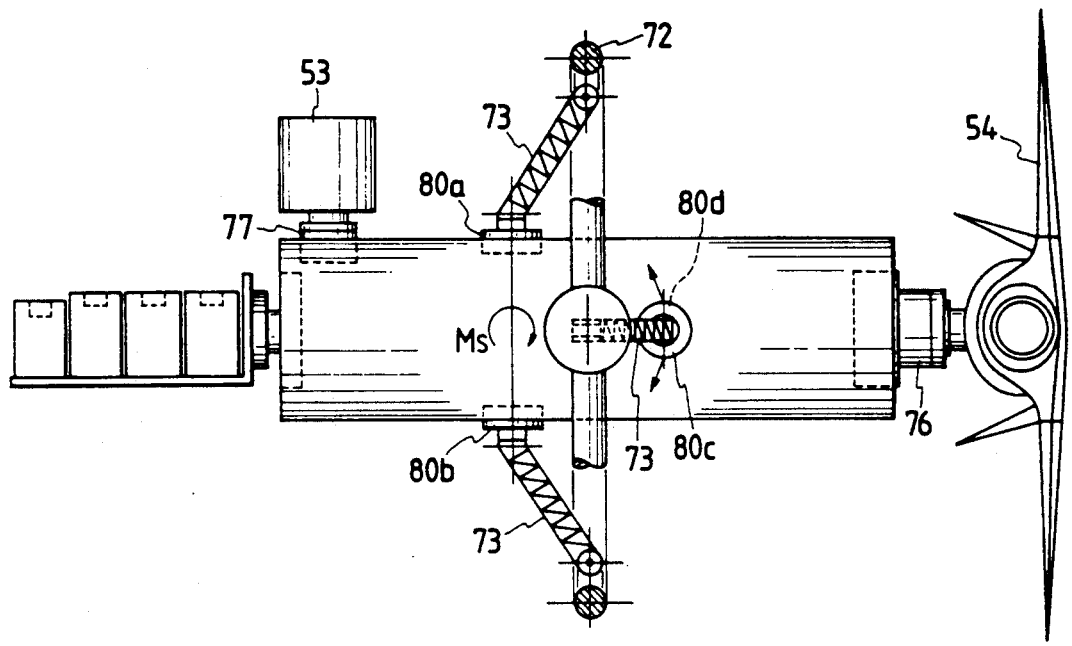
FIG. 7 is a side view of supporting an experimental module.
Figure 8:
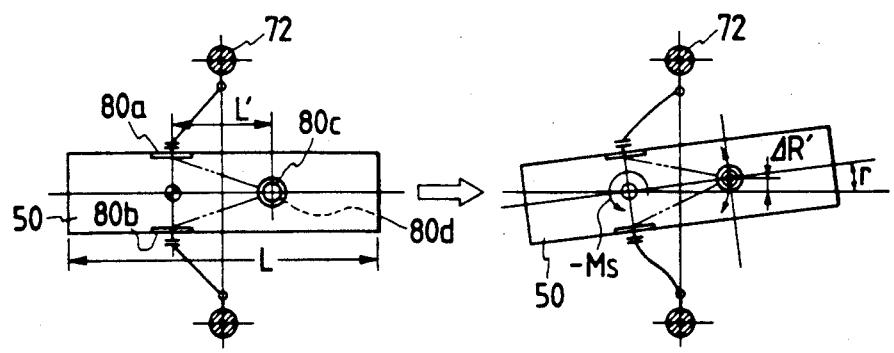
FIG. 8 is a principle view of the active damping of the experimental module shown in FIG. 7.

In the ring track 72, as shown in FIGS. 7 and 8, four docking devices 80a, 80b, 80c and 80d according to the present invention are arranged at right angles to each other symmetrically about the ring track surface on the outer wall of the pressurized module, one end thereof being connected to the docking ring of the docking member while the other end being supported on four supporting beams 73 rotatably connected to the ring track. With the ring having the supporting construction as described above, there can be provided features such that the length L' between the supporting points with the ring track put therebetween can be increased, and if the L' is made to be larger than the diameter of the module and the ratio L/L' between the axial length L of the module and the L' is made to be small, a displacement of the active damping becomes large, which can cope with the large vibration to make the active damping easy. For example, in the case where pitching occurs as shown in the drawing, the upper and lower docking devices 80a and 80b are locked, and a moment calculated by the signal from the sensor provided in the docking portion is received and fed back to the left and right docking devices 80c and 80d to move up and down the docking member of the active damping, whereby the active damping can be carried out effectively.

The deployable mast 51 and the solar battery paddle 52 are coupled through the docking devices 81 and 82. The devices change the direction of the solar dynamic generator 74 and the solar battery paddle 52 to track the sun, and displace them according to the vibration to suppress the vibration. A docking device 83 is applied to one hinge of the docking portion of each unit of the solar battery paddle 52, and the active damping can be also made every individual unit.

A docking device 84 is provided also at the extreme end of the deployable mast 51, and to the passive side thereof is connected a base 89 to which are mounted a collector 85 of a solar dynamic generator, a receiver 86, an engine 87 and a heat exchanger 88. The receiver 86 is mounted on the base 89 through the docking device, whereby the adjustment of alignment of the relative position between the focus position of the collector and the position of the receiver can be facilitated to further improve the performance of the solar dynamic system. The docking device described in the first embodiment is provided on the docking hatch 76 for the space shuttle of the pressurized module and the hatch 77 for docking the logistic module, whereby the space shuttle and the logistic module can be captured and docked and the vibrations thereof can be automatically suppressed.

Figure 9:
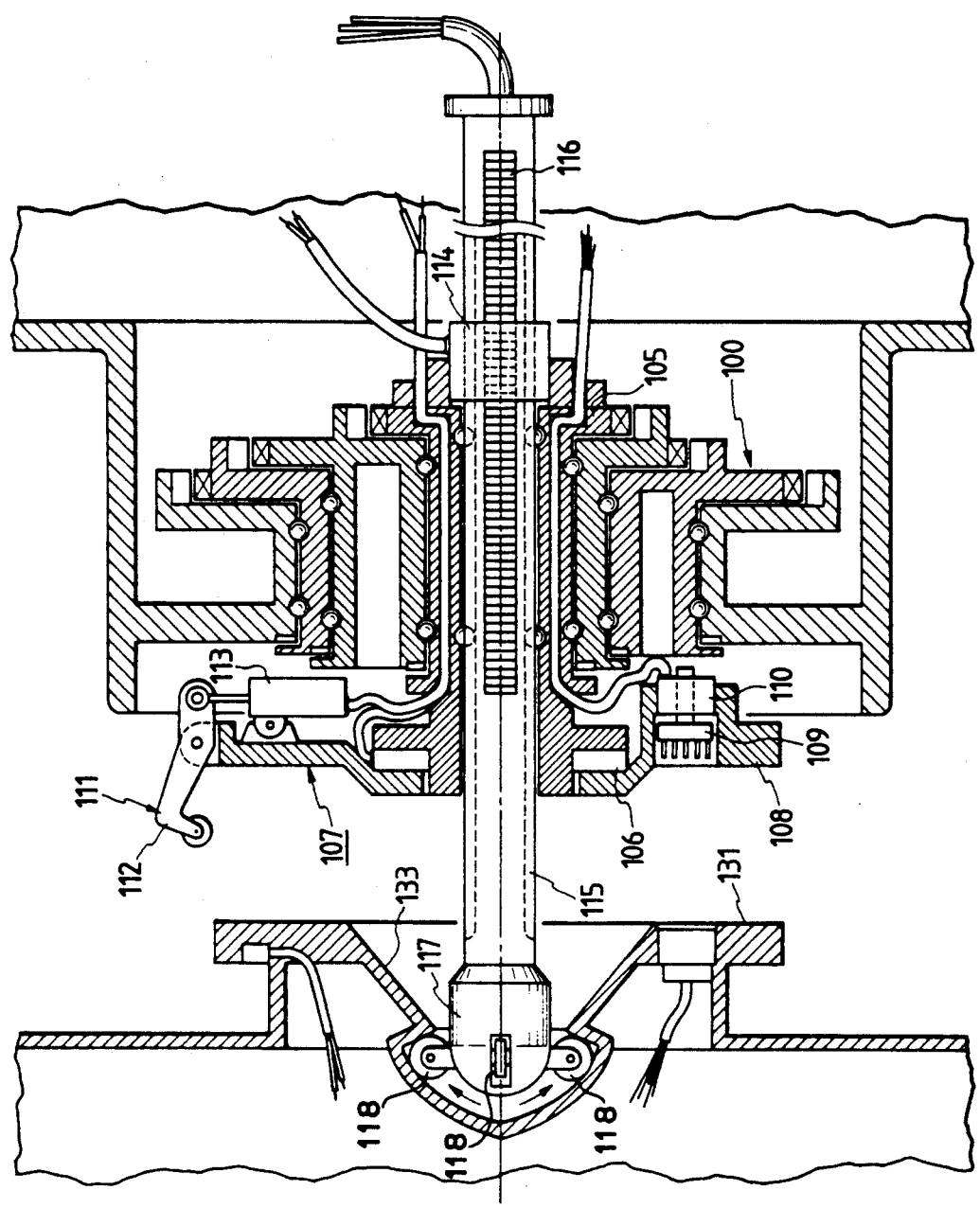
FIG. 9 is a side sectional view showing another embodiment of a docking and active damping device for spaced structures according to this invention.
Figure 10:
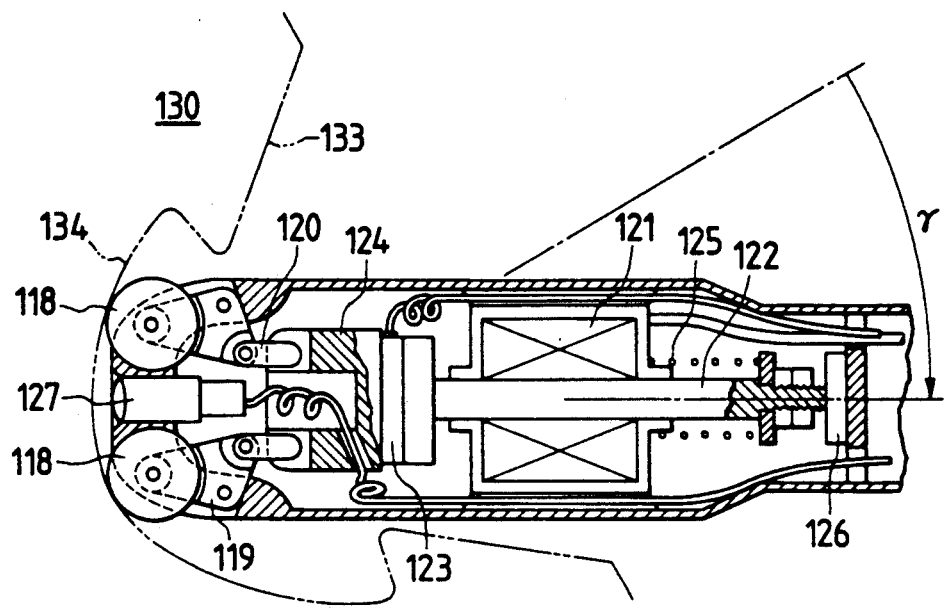
FIG. 10 is a sectional view in enlarged scale of the extreme end of a probe in a state wherein a latch roller of FIG. 9 is closed.
Figure 11:
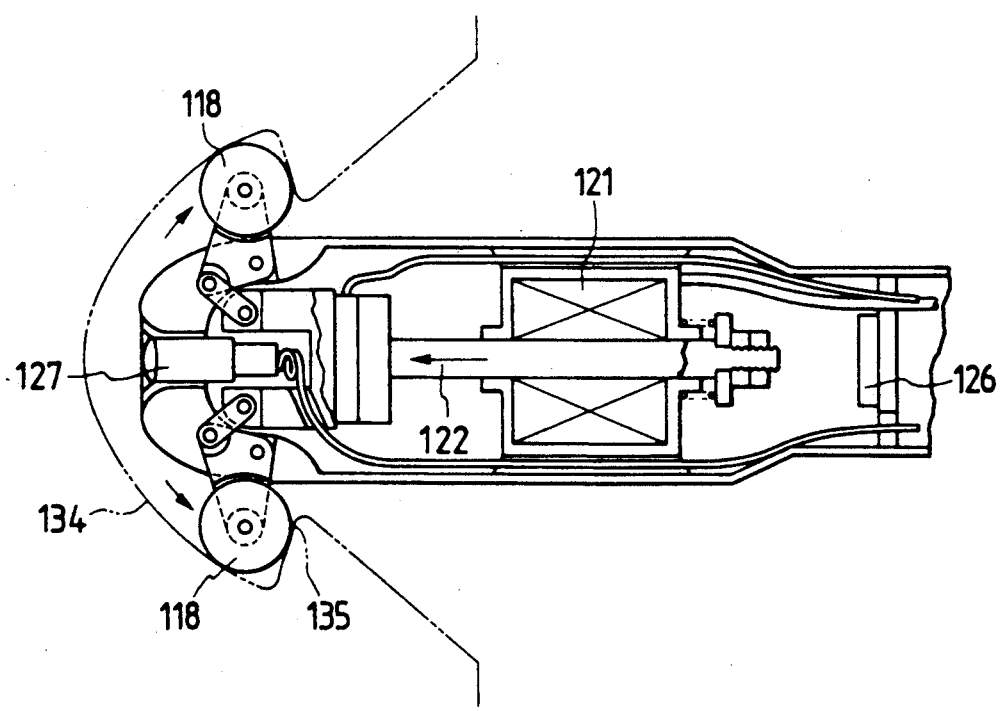
FIG. 11 is a sectional view in enlarged scale of the extreme end of a probe in a state wherein a latch roller of FIG. 9 is spread.

FIG. 9 shows an embodiment of a docking device used for a docking portion of a space structure in which persons and materials need not be moved, wherein a probe cannot be mounted on or removed from a positioning device. In the present embodiment, a docking ring 108 of a docking portion 107 is mounted through a strain sensor 106 on the extreme end of an output rotor 105 of a locating device 100 having a construction substantially similar to that of the positioning device in the previous embodiment. A signal connector 109 and an electromagnetic actuator 110 for driving the former are mounted on the docking ring 108. A plurality of latch devices 111 in engagement with a latch engaging member of the passive side structure are provided in the outer peripheral portion of the docking ring 108. In FIG. 9, reference numeral 112 designates a latch of the latch device, and 113 an electro-magnetic actuator for driving the latch.

The output rotor 105 of the positioning device 100 has a capture probe 115 held movably in and out. The capture probe 115 is axially slidably inserted and held within a cylindrical inner wall of the output rotor 105 of the locating device and is axially slidably driven by a linear motor 114 for driving the probe. Reference numeral 116 designates a magnet which forms a linear motor provided on the probe. The sliding and driving mechanism for the probe does not necessarily comprise a linear motor, but a suitable mechanism such as a rack and pinion mechanism driven by a rotational motor, a hydraulic cylinder mechanism or the like can be employed.

In a head 117 at the extreme end of the probe 115, four latch rollers 118 are arranged at equal intervals (90°) outwardly of the head so that the latch rollers 118 may be spread by means of a link mechanism 119. The other end of a drive side link 120 of the link mechanism 119 is connected to a member 124 secured to an operating rod 122 of an electromagnetic actuator 121 through a load cell 123. Reference numeral 125 designates a spring for inwardly urging the operating rod, and 126 a stopper for the operating rod. A microtelevision camera 127 is provided on the extreme end of the probe. Reference numeral 130 designates a passive side structure, and at a docking part thereof is provided a docking surface 131 in engagement with the docking ring 108 on the active side and a conical drogue 133 is formed in the center portion thereof. A latch roller engaging portion 134 in engagement with a latch roller of the probe is formed in the deepest end of the drogue 133. The latch roller engaging portion 134 has a latch roller guide surface formed in a locus depicted by the extreme end of the latch roller when the latch roller 118 is spread within the engaging portion in the case where the engaging surfaces of both the modules are in a completely parallel state, and a latch roller engaging surface 135 formed so that the docking surface of the passive side module is parallel with the docking surface of the active side module in the case where the latch roller is completely spread.

The docking of the space structures is carried out in the following procedure by the docking device having the capture means constructed as described above.

When both the structures comes close to each other, the linear motor 114 for driving the probe is actuated so that the probe 115 extends forwardly from the positioning device 100. Simultaneously, the probe 115 detects the position of the drogue 133 of the mating structure to be docked by the microtelevision camera 127 placed at the extreme end of the probe 115, the positioning device 100 is controlled by the detection signal thereof. The probe 115 is made to effect translation movement and rotation within the two-dimensional plane according to the position of the mating structure so as to assume its optimum position, and at the same time, the probe 115 is run into the drogue 133 to capture the passive side structure.

When the extreme end of the probe 115 moves into the deepest end of the drogue 133 and the latch roller 118 impinges upon the latch roller guide surface 134, a reaction thereof is detected by the load cell 123, whereby the electromagnetic actuator 121 for driving the latch roller is actuated so that the operating rod 122 is urged forward whereby the latch roller 118 is gradually spread by the link mechanism. At that time, the latch roller 118 rolls and moves along the latch roller guide surface 134 of the drogue 133 to apply a force to the drogue 133 to correct the position of the drogue 133. If the passive side module is inclined by an angle with respect to the active side module, any one of four latch rollers 118 arranged at intervals of 90° first comes into engagement with the latch engaging surface halfway the latch roller 118 is spread to press the engaging surface, whereby the attitude of the passive side structure is corrected. When the latch roller is fully spread, both the structures are completely parallel with each other and captured in the state wherein the axes of both the structures are in a complete registration. Thereafter, the linear motor 114 for driving the probe is actuated so that both the structures are docked in a manner similar to those described in FIG. 2. Upon termination of docking, the docking ring 107 and the docking surface on the passive side become completely joined. The vibration on the passive side is detected by the strain sensor 106, and the positioning device is actuated accordingly to thereby correct the position of the passive side. Accordingly, if the docking device according to the present invention is employed for the docking portion or the docking portion of the solar battery paddle plate in the skeleton of the space station, in the case where vibrations occur in the space station, the attitude of the mating side can be automatically controlled by the positioning device in a direction of detecting and absorbing the vibration by the strain sensor.

What is claimed is:

1. A docking and active damping device for space structures for docking a plurality of space structures or space structure elements including:
  a positioning device having a fixed cylinder provided on a frame of a docking portion of one space structure to be docked, one or more eccentric rotors successively eccentrically provided between said fixed cylinder and an output rotor, and a hollow output rotor provided at an eccentric position of the final eccentric rotor, said eccentric rotors and said output rotor being independently driven and controlled by an electric direct drive motor; and
  a docking member supported on the output rotor of said positioning device, having a docking ring joined with a docking surface of the other space structure to be docked, and having a plurality of latch mechanisms in an outer peripheral portion of said docking surface, said docking member capable of being moved and axially rotated within a two-dimensional plane vertical to at least the docking direction by said positioning device.

2. The docking and active damping device for space structures according to claim 1, wherein the docking member has a cylindrical parts fitted in a hollow portion of the positioning device, said cylindrical parts having a docking ring at the extreme end thereof, said docking member being provided axially movably on the output rotor, and a probe having a capture mechanism for capturing the other space structure at the extreme end thereof is expansibly provided on the cylindrical parts of said docking member, said probe being provided removably from the hollow portion of the docking member after the space structure t be docked has been docked.

3. The docking and active damping device for space structures according to claim 1, wherein the docking member is provided at the extreme end of an output shaft of the positioning device, the hollow portion of the output rotor of the positioning device has a latch mechanism in engagement with a drogue of the space structure to be docked at the extreme end thereof, and a probe is provided movably in and out, said probe capable of being moved and axially rotated within the two-dimensional plane vertical to the axial direction by said positioning device, said probe capable of being projected and driven by an axial drive means provided on the output shaft rotor of said positioning device.

4. The docking and active damping device for space structures according to claim 3, wherein an access monitor device such as a small television is provided at the extreme end of the probe.

5. A docking and active damping device for space structures for suppressing vibrations of space structures in which a plurality of space structure elements or space structures are docked and assembled, said device including:
  a positioning device having a fixed cylinder provided on a frame of a docking portion of one space structure to be docked, one of more eccentric rotors successively eccentrically provided between said fixed cylinder and an output rotor, and an output rotor fitted in an inner wall of a cylinder formed at a position eccentric with the final eccentric rotor, said eccentric rotor and said output rotor being independently rotated and controlled by an electric direct drive motor;
  a docking member supported on the output rotor of said positioning device, said docking member having a docking ring joined with a docking surface of the other space structure to be docked and having a plurality of latch mechanisms in the outer peripheral portion of said docking surface, said docking member being moved and axially rotated within a 2-dimensional plane vertical to at least docking direction by said positioning device;
  vibration detection means for detecting vibrations of the other docked space structure; and
  control means for controlling said positioning device of the docking member so as to move it in a direction of suppressing the vibrations of said structure elements to be docked by an output signal of said vibration detection means.

6. The docking and active damping device for space structures according to claim 5, wherein a docking ring of the docking member is mounted through a sensor on the extreme end of the cylindrical member fitted in the output rotor of the positioning device through an axial expansion drive member, said docking ring being provided with umbilical connecting member for connecting a signal cable to the space structure to be docked.

* * * * *

UNITED STATES PATENT AND TRADEMARK OFFICE
CERTIFICATE OF CORRECTION

PATENT NO. : 5,005,786
DATED : April 9, 1991
INVENTOR(S) : OKAMOTO et al

It is certified that error appears in the above-identified patent and that said Letters Patent is hereby corrected as shown below:

On the title page, Item [73], "Kawasaki Industries, Ltd.", should read --Kawasaki Heavy Industries, Ltd.--.

Signed and Sealed this

Third Day of November, 1992

Attest:

DOUGLAS B. COMER

*Attesting Officer*      *Acting Commissioner of Patents and Trademarks*